(12) United States Patent
Xiong et al.

(10) Patent No.: US 10,127,202 B2
(45) Date of Patent: Nov. 13, 2018

(54) DETECTING OVERLAPPING WEB ELEMENTS IN A GRAPHICAL USER INTERFACE

(71) Applicant: CA, Inc., New York, NY (US)

(72) Inventors: Zaiwei Xiong, Beijing (CN); Yue Liu, Beijing (CN); Mingzhe Cai, Beijing (CN); Fang Wu, Beijing (CN)

(73) Assignee: CA, Inc., New York, NY (US)

( * ) Notice: Subject to any disclaimer, the term of this patent is extended or adjusted under 35 U.S.C. 154(b) by 368 days.

(21) Appl. No.: 14/810,972

(22) Filed: Jul. 28, 2015

(65) Prior Publication Data

US 2017/0031880 A1 Feb. 2, 2017

(51) Int. Cl.
*G06F 17/00* (2006.01)
*G06F 17/22* (2006.01)
*G06F 17/30* (2006.01)

(52) U.S. Cl.
CPC .... *G06F 17/2247* (2013.01); *G06F 17/30896* (2013.01)

(58) Field of Classification Search
None
See application file for complete search history.

(56) References Cited

U.S. PATENT DOCUMENTS

| | | | |
|---|---|---|---|
| 7,363,583 B1* | 4/2008 | Costa | G06Q 10/10 715/734 |
| 7,895,514 B1 | 2/2011 | Edmunds et al. | |
| 2014/0013214 A1* | 1/2014 | Hunter | G06T 11/60 715/246 |
| 2015/0346982 A1* | 12/2015 | Johnson | G06F 11/3664 715/763 |
| 2017/0221242 A1* | 8/2017 | Street | G06T 5/50 |

* cited by examiner

*Primary Examiner* — Mohammed-Ibrahim Zuberi
(74) *Attorney, Agent, or Firm* — Meyertons, Hood, Kivlin, Kowert & Goetzel, P.C.

(57) ABSTRACT

A method and apparatus is provided for automatically detecting layout corruption in graphical user interface (GUI). A layout detection system iteratively analyzes web elements contained in a GUI page. The layout detection system identifies a parent web element and its child web elements. Overlapping web elements are detected by comparing an area of the parent web element to the total area of child web elements contained within the parent web element.

11 Claims, 6 Drawing Sheets

FIG. 1

| ELEMENT | CHILDREN | RESULT |
|---|---|---|
| ELEMENT1 | ELEMENT04;ELEMENT05;...;ELEMENTi | 0 |
| ELEMENT2 | ELEMENT08;ELEMENT09;...;ELEMENTj | 1 |
| ELEMENT3 | | 0 |
| ELEMENT4 | ELEMENT21;ELEMENT 22;...;ELEMENTl | 0 |
| ... | ... | ... |
| ELEMENTn | ELEMENT58;ELEMENT59;...;ELEMENTm | RESULTn |

*FIG. 4*

DETECTING OVERLAPPING WEB ELEMENTS IN A GRAPHICAL USER INTERFACE

BACKGROUND

The present disclosure relates generally to testing of graphical user interfaces (GUIs) and, more particularly to detection of layout corruption problems in a GUI.

Hypertext Markup Language (HTML) is a standard markup language that is used to create most webpages. An HTML document comprises web elements that describe the structure and content of the webpage. A web browser reads the HTML document and renders the webpage described by the HTML document in a browser window. Common browsers include INTERNET EXPLORER®, SAFARI®, FIREFOX®, and CHROME®. Different versions of these browsers exist for different operating systems, such as MICROSOFT WINDOWS®, APPLE OSX®, APPLE IOS®, and ANDROID®.

For many web based applications, a browser is also used to remotely access an application located on a remote server. The graphical user interface (GUI) for the application is displayed in a browser window. The GUI is essentially a collection of HTML documents that are rendered by the browser. Before such web-based applications are released, GUI testing is performed to ensure that the GUI displays properly in the browser window.

A common problem with GUI testing is that there are many different browsers and many operating systems. Both the browser and the operating system impact how an HTML document is rendered on the screen. Also, the language used for text elements in an HTML document impacts how the GUI or web page is rendered. Given the multitude of browsers, operating systems, and languages, it is impractical to test every possible combination. Consequently, user interface testing is usually limited to the most common combinations of browsers and operating systems, and for only a few languages. Because all possible combinations are not tested, there is a risk that the GUI will not render properly in some scenarios resulting in corruption of the GUI layout. Common layout corruption problems include overlapping web elements and overlapping web elements.

In order to improve quality of web-based software products, there is a need to automate GUI testing in order to minimize the number of layout corruption problems.

BRIEF SUMMARY

One aspect of the present disclosure comprises a method and apparatus for automatically detecting overlapping web elements in graphical user interface (GUI). A layout detection system iteratively analyzes web elements contained in a GUI page. In each iteration, the layout detection system identifies a parent web element and its child web elements. Overlapping web elements are detected by comparing an area of the parent web element to the total area of child web elements contained within the parent web element.

Of course, those skilled in the art will appreciate that the present embodiments are not limited to the above contexts or examples, and will recognize additional features and advantages upon reading the following detailed description and upon viewing the accompanying drawings.

BRIEF DESCRIPTION OF THE DRAWINGS

Aspects of the present disclosure are illustrated by way of example and are not limited by the accompanying figures with like references indicating like elements.

FIG. 1 illustrates overlapping web elements in a GUI.

FIG. 4 illustrates an exemplary web element list used for detecting overlapping web elements in a GUI

DETAILED DESCRIPTION

Figure 2:
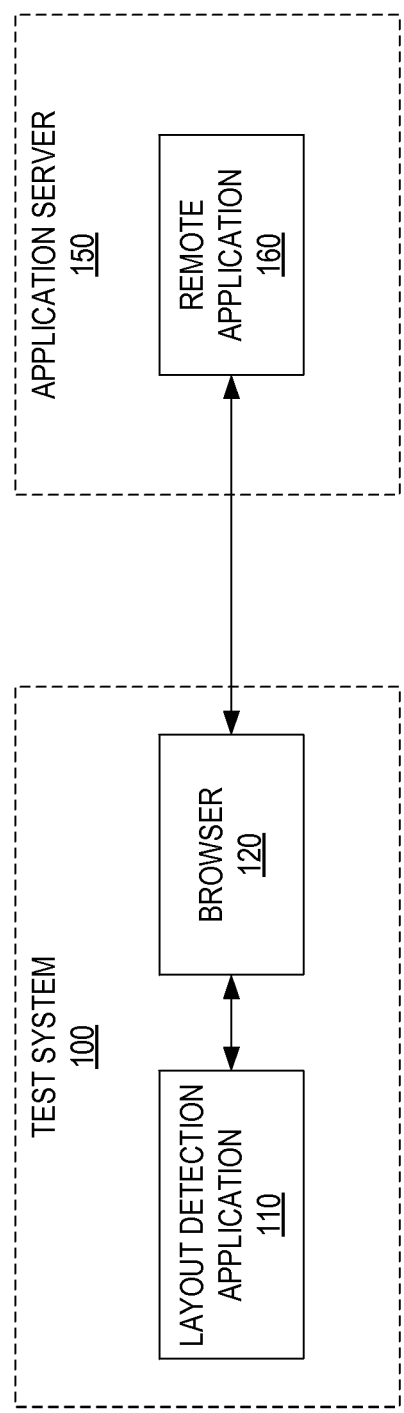
FIG. 2 illustrates one embodiment of a layout detection system configured to detect overlapping web elements in a GUI.

As will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.) or combining software and hardware implementation that may all generally be referred to herein as a "circuit," "module," "component," or "system." Furthermore, aspects of the present disclosure may take the form of a computer program product embodied in one or more computer readable media having computer readable program code embodied thereon.

Any combination of one or more computer readable media may be utilized. The computer readable media may be a computer readable signal medium or a computer readable storage medium. A computer readable storage medium may be, for example, but not limited to, an electronic, magnetic, optical, electromagnetic, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable signal medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C#, VB.NET, Python or the like, conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable instruction execution apparatus, create a mechanism for implementing the functions/acts specified in the flowchart and/or block diagram block or blocks.

These computer program instructions may also be stored in a computer readable medium that when executed can direct a computer, other programmable data processing apparatus, or other devices to function in a particular manner, such that the instructions when stored in the computer readable medium produce an article of manufacture including instructions which when executed, cause a computer to implement the function/act specified in the flowchart and/or block diagram block or blocks. The computer program instructions may also be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Figure 1:
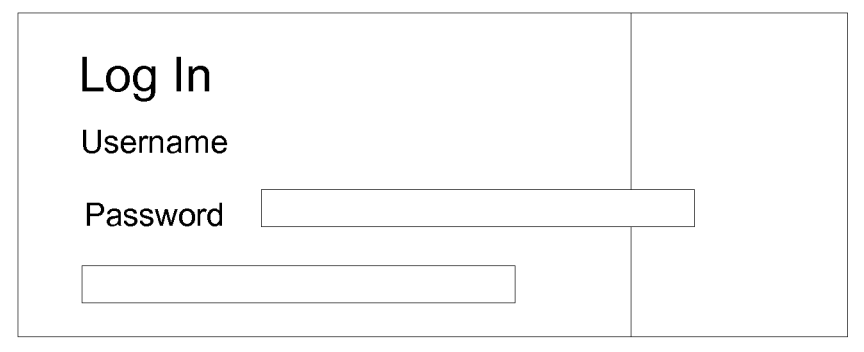

Referring now to the drawings, methods and apparatus are described to perform automated testing of a graphical user interface (GUI) to detect layout corruption problems. One common type of layout corruption is overlapping web elements. In a graphical user interface, web elements may serve as containers for other web elements. A web element containing other web elements is referred to as a parent web element. The web elements contained within the parent web element are called child web elements. A web element that is a child of another web element may also be a parent of other web elements. Overlapping web elements occur when the area of a parent web element is too small to contain its child web elements. FIG. 1 shows an example of overlapping web elements where the box for entering the username is displaced to the right and overlaps another web element.

FIG. 2 is a schematic representation of an automated layout detection system 100 according to an exemplary embodiment of the disclosure that detects layout corruption problems in a GUI of a web-based application. The layout detection system 100 comprises a computer that serves as the platform for the layout detection system 100. The computer has a layout detection application 110 and one or more browsers 120 to be tested installed thereon. The browsers 120 are able to remotely access a user application 160 installed on an application server 150. As previously described, the user application 160 comprises a GUI that is to be tested by the layout detection system 100. The layout detection application 110 controls and interacts with a selected browser 120 during testing as will be hereinafter described.

In one exemplary embodiment, the layout detection application 110 uses a browser object model (BOM) and document object model (DOM) to interact with and control a browser 120 selected for a test. The BOM is a convention for representing objects in the browser application 120 and provides an application programming interface (API) that exposes the functionality of the browser 120 to the layout detection application 110. In general, the BOM is application specific, so different browsers 120 will have different BOMs. The layout detection application 110 can use the BOM for example to instruct the browser 120 to access the user application 160 on the application server 150, to navigate among the different pages in the GUI of the user application 160, and otherwise control the browser. The DOM, which may be considered part of the BOM, is a convention for representing objects in a HTML document that is displayed by the browser 120 and provides an API that is used to dynamically access and update the HTML document. The DOM is generally cross-platform and language independent. The layout detection application 110 can use the DOM for example to extract information about objects in the GUI displayed by the browser 120 and to update the objects in the GUI.

During testing, the layout detection application 110 instructs a browser 120 to remotely access the user application 160 on the application server 150 and to navigate among the different pages of the GUI provided by the user application 160. When a page of the GUI is loaded, the layout detection application 110 uses the BOM and DOM to parse the current page of the GUI and identify web elements contained within the page. The term web elements as used herein refers to visual elements in the GUI, which are represented by DOM objects. Examples of web elements include paragraphs, tables, sections, buttons, text boxes, labels, drop down lists, etc. As will be hereinafter described in greater detail, the layout detection application 110 iteratively analyzes the web elements in a page of the GUI to detect overlapping web elements.

Figure 3:
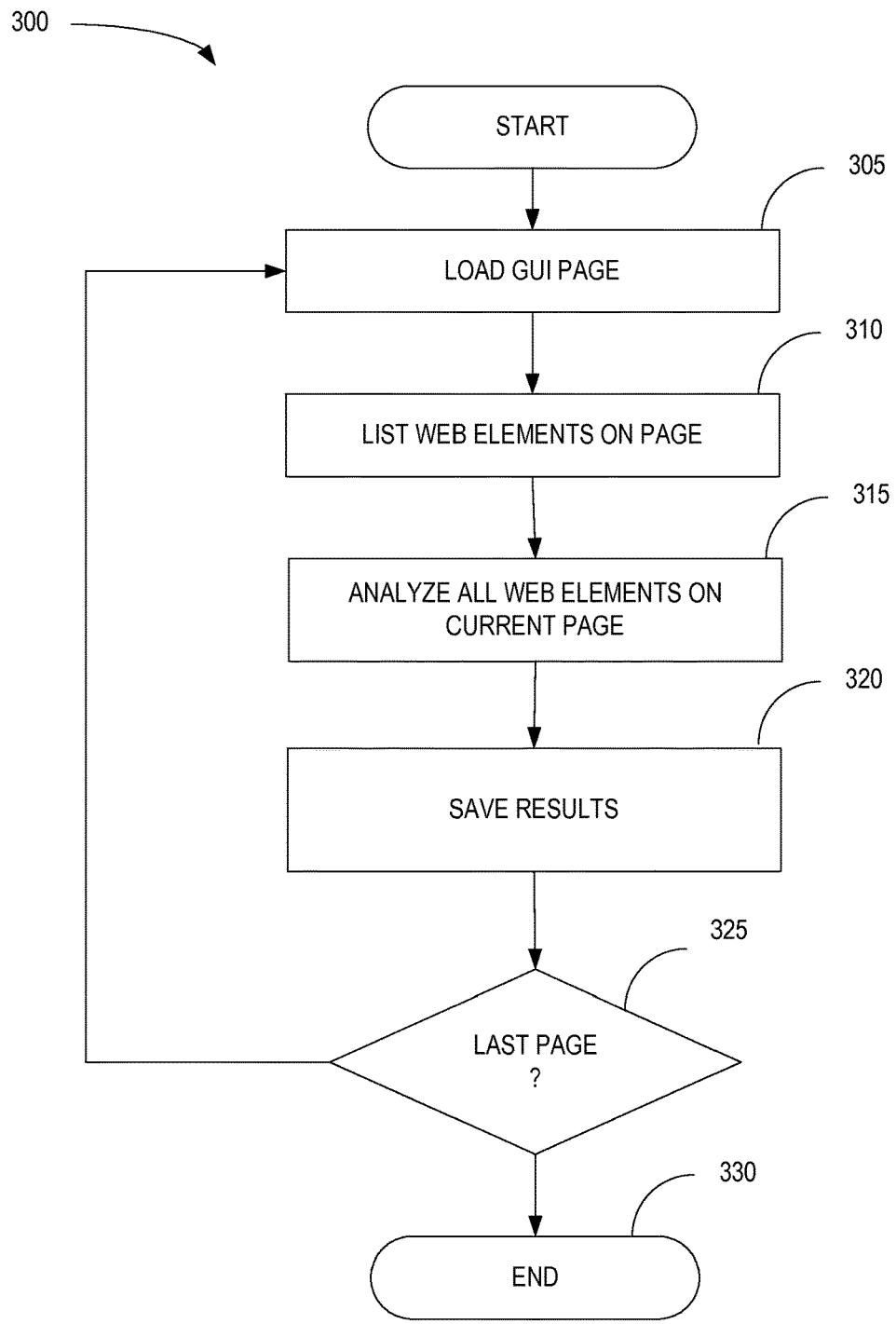
FIG. 3 illustrates a method of overlapping web elements in a GUI.

FIG. 3 illustrates an exemplary method 300 for detecting overlapping web elements in a graphical user interface. To begin, the layout detection application 110 causes a selected browser 120 to load an initial page of the GUI (block 305). As previously noted, each page of the GUI is described by a HTML document and the web elements on the page are represented as DOM objects. The layout detection application 110 may obtain a listing of DOM objects in the GUI page from the browser 120 and parse the listing of DOM objects to identify the web elements for processing (block 310). In one embodiment, the layout detection application 110 may generate a listing of the web elements in the GUI page. This list is referred to herein as the web element list. In general, the GUI page will contain a plurality of web elements arranged in a hierarchical tree structure. To generate the web element list, the layout detection application 110 may begin with the web element at the top level of the tree structure and traverse the tree structure either breath-first or depth-first to make a list of web elements. In generating the web element list, the layout detection application 100 may be interested in only certain types of web elements and not others. Thus, the web element list may contain a subset of all web elements in the GUI page of a predefined type or types.

FIG. 4 illustrates an exemplary web element list used in detecting overlapping web elements according to one embodiment. Each row in the list represents a web element. The first column contains a handle or other identifier for the web element. The second column contains a list of child web elements contained in the web element. A null value indicates that there are no child web elements. The last column indicates results of the testing performed by the layout detection application 100. Those skilled in the art will appreciate that the web element list could include more columns for additional information. For example, the web element list could include columns for storing the dimensions and/or area of the web elements. Also, it will be appreciated that some embodiments may be implemented without using a web element list as described herein. Thus, the example web element list should not be construed as being limiting or construed as requiring a web element list.

Referring back to FIG. 3, after generating the web element list, the layout detection application 110 analyzes each web element in the web element list to detect instances of overlapping web elements (block 315). After examining each web element, the layout detection application 110 saves the results (block 320). For example, the layout detection application 110 may enter a code value indicating the results of the test for each web element in the results column of the web element list. The code value may be used to indicate whether an overlapping web elements problem exists. For example, a code value of "0" may be used to indicate no overlapping web elements, a code value of "1" may be used to indicate overlapping web elements. After saving the results of the analysis, the layout detection application 110 determines whether there are any more pages to be tested (block 325). If so, the layout detection system 100 returns to block 305 and loads the next page. The processing continues until the last page is reached at which time the process ends (block 330).

Figure 5:
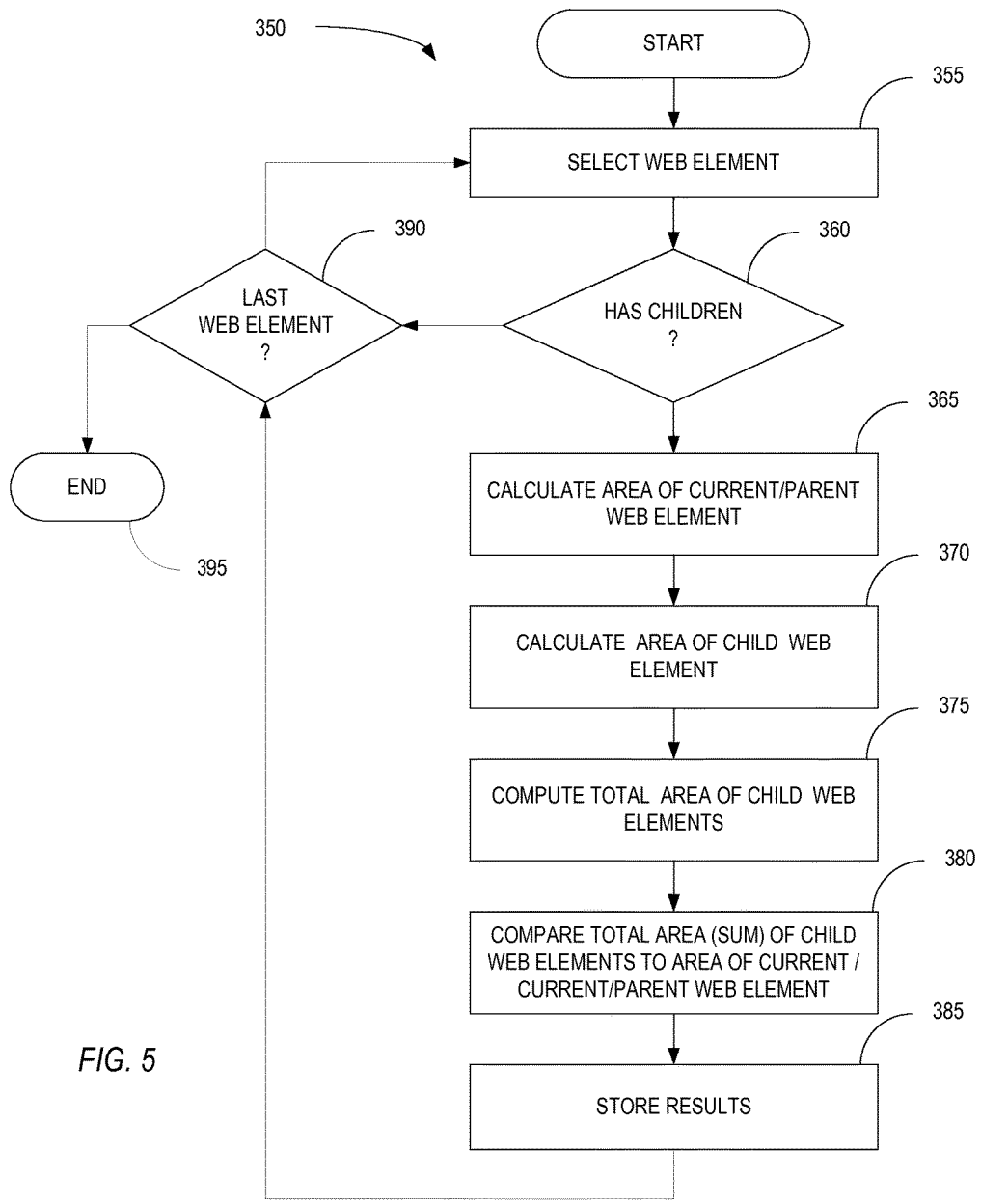
FIG. 5 illustrates a method of analyzing web elements in a GUI to detect overlapping web elements, which may be used in the method of FIG. 3.

FIG. 5 illustrates an exemplary method 350 used by the layout detection application 110 for detecting overlapping web elements. The method shown in FIG. 5 may be performed at block 315 of FIG. 3. In general, the method 350 iterates through the web elements in the web element list beginning with a first web element. At each iteration, the layout detection application 110 determines whether the current web element has any child web elements (block 360). If so, the layout detection application 110 calculates the area of the current/parent web element and each child element of the current/parent web element (blocks 365, 370). The layout detection application 110 then computes a total area of the child web elements (block 375). To detect overlapping web elements, the layout detection application 110 compares the area of the current/parent web element to the total area of the child web elements (block 380). Overlapping web elements are detected when the total area of the child web elements is greater than the area of the current/parent web element. At the end of each iteration, the results are stored (block 385). The layout detection application then determines whether the last web element has been reached (block 390). If not, the layout detection application 110 returns to block 355 and selects the next web element. This process is repeated until the last web element is reached and then the process ends (block 395).

Figure 6:
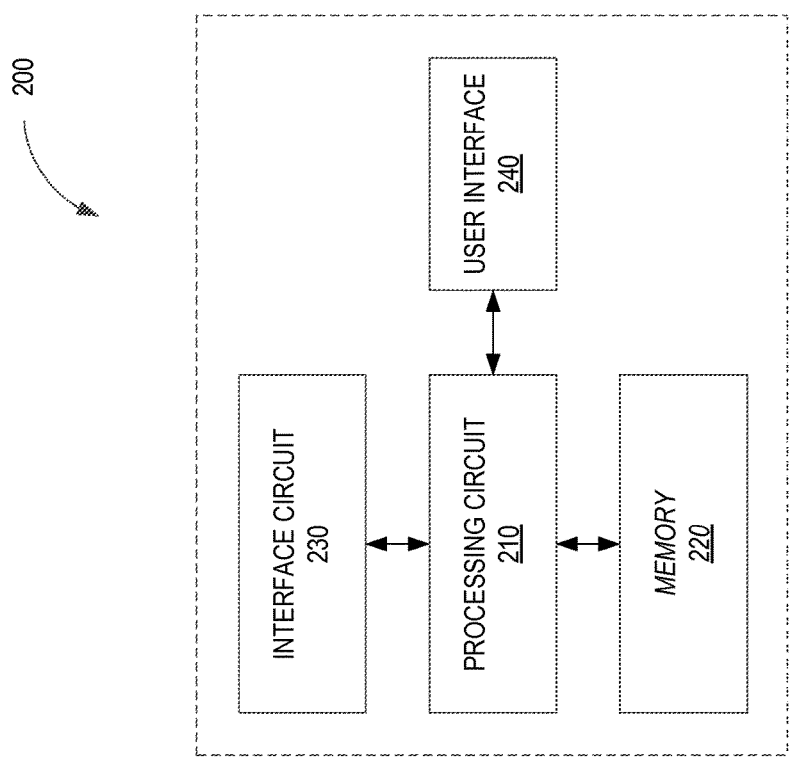
FIG. 6 illustrates the main functional components of layout detection system for detecting overlapping web elements in a GUI.

FIG. 6 is a block diagram illustrating some of the functional components of a computing device 200 configured to function as a layout detection system 100. The computing device 200 in one embodiment comprises a processor circuit 210, a memory circuit 220 that stores program code and data needed for operation, and an interface circuit 230 for communicating with remote devices, such as application server 150, over a communication network. In some embodiments, the computing device 200 may further include a user interface 240. Those skilled in the art will readily appreciate that the computing device 200 seen in FIG. 9 may comprise more or fewer components that are illustrated here.

The processor circuit 210 may be implemented as one or more microprocessors, hardware, firmware, or a combination thereof. The processor circuit 210 is configured to perform GUI testing as herein described. Memory 220 stores programs and instructions, such as layout detection application 110 and browsers 120, that are used by the processor circuit 210 to perform GUI testing. Memory 220 may comprise any non-transitory, solid state memory or computer readable storage media known in the art. Suitable examples of such media include, but are not limited to, ROM, DRAM, Flash, or a device capable of reading computer-readable storage media, such as optical or magnetic media. The interface circuit 230 comprises a transceiver or other communications interface that facilitates communications with remote devices via a communication network, such as an IP network 12. Those of ordinary skill in the art will appreciate that the interface circuit 230 may be configured to communicate with these entities using any protocol known in the art. However, in one embodiment, the interface circuit 230 comprises an ETHERNET card configured to transmit and receive data using the well-known TCP/IP protocol. The user interface 240 may comprise a display and one or more input devices. The display may comprise an LED or LCD display. In one embodiment, a touch screen display may be used that also functions as an input device. The input device(s) may comprise a keyboard, keypad, joystick, track ball, touch pad, voice input, image input, or other input device.

The present embodiments may, of course, be carried out in other ways than those specifically set forth herein without departing from essential characteristics of the disclosure. For example, it should be noted that the flowchart and block diagrams in the Figures illustrate the architecture, functionality, and operation of possible implementations of systems, methods and computer program products according to various aspects of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, to blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular aspects only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of any means or step plus function elements in the claims below are intended to include any disclosed structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The aspects of the disclosure herein were chosen and described in order to best explain the principles of the disclosure and the practical application, and to enable others of ordinary skill in the art to understand the disclosure with various modifications as are suited to the particular use contemplated.

Thus, the foregoing description and the accompanying drawings represent non-limiting examples of the methods and apparatus taught herein. As such, the present invention is not limited by the foregoing description and accompanying drawings. Instead, the present invention is limited only by the following claims and their legal equivalents.

What is claimed is:

1. A computer-implemented method comprising:
   selecting a current web element in a GUI;
   identifying one or more child web elements of the current web element;
   computing a first area associated with the current web element;
   for each child web element, computing a second area associated with the child web element;
   computing a total area of the one or more child web elements by summing the second area associated with each of the one or more child elements; and
   detecting overlapping web elements when the total area is greater than the first area.

2. The method of claim 1 wherein selecting a current web element in a GUI comprises selecting a web element of a predetermined type as the current web element.

3. The method of claim 1 wherein identifying one or more child web elements of the current web element comprises identifying one or more child web elements of a predetermined type.

4. The method of claim 1 wherein computing a first area associated with the current web element comprises:
   obtaining dimensions of the current web element from a browser; and
   computing the first area based on the dimensions of the current web element.

5. The method of claim 1 wherein computing a second area associated with the child web element comprises:
   obtaining dimensions of the child web element from a browser; and
   computing the second area based on the dimensions of the child web element.

6. A computing device comprising:
   an interface circuit for communicating via a communication network with remote devices; and
   a processor circuit configured to:
   select a current web element in a GUI;
   identify one or more child web elements of the current web element;
   compute a first area associated with the current web element;
   for each child web element, compute a second area associated with the child web element;
   compute a total area of the one or more child web elements by summing the second area associated with each of the one or more child elements; and
   detect overlapping web elements when the total area is greater than the first area.

7. The computing device of claim 6 wherein, to select a current web element in a GUI, the processor circuit is configured to select a web element of a predetermined type as the current web element.

8. The computing device of claim 6 wherein, to identify one or more child web elements of the current web element, the processor circuit is configured to identify one or more child web elements of a predetermined type.

9. The computing device of claim 6 wherein, to compute a first area associated with the current web element, the processor circuit is configured to:
   obtain dimensions of the current web element from a browser; and
   compute the first area based on the dimensions of the current web element.

10. The computing device of claim 6 wherein, to compute a second area associated with the child web element, the processor circuit is configured to:
    obtain dimensions of the child web element from a browser; and
    compute the second area based on the dimensions of the child web element.

11. A computer readable storage medium storing executable instructions that when executed by a processor circuit in a computing device, causes the computing device to:
    select a current web element in a GUI;
    identify one or more child web elements of the current web element;
    compute a first area associated with the current web element;
    for each child web element, compute a second area associated with the child web element;
    compute a total area of the one or more child web elements by summing the second area associated with each of the one or more child elements; and
    detect overlapping web elements when the total area is greater than the first area.

* * * * *